United States Patent [19]

Yarborough et al.

[11] Patent Number: 5,226,054
[45] Date of Patent: Jul. 6, 1993

[54] CAVITY MIRROR FOR SUPPRESSING HIGH GAIN LASER WAVELENGTHS

[75] Inventors: J. Michael Yarborough, Tucson, Ariz.; Dennis Fischer, Auburn, Calif.; Gerald Mitchell, Tucson, Ariz.

[73] Assignee: Coherent, Inc., Palo Alto, Calif.

[21] Appl. No.: 761,695

[22] Filed: Sep. 18, 1991

[51] Int. Cl.[5] .............................................. H01S 3/08
[52] U.S. Cl. ...................... 372/100; 372/108; 372/99; 372/23
[58] Field of Search .................. 372/92, 99, 100, 108, 372/98, 23

[56] References Cited

U.S. PATENT DOCUMENTS

| | | | |
|---|---|---|---|
| 3,675,153 | 7/1972 | Bakeman et al. | 372/100 |
| 3,959,740 | 5/1976 | Dewhirst | 372/100 |
| 3,965,439 | 6/1976 | Firester | 372/100 |
| 4,468,775 | 8/1984 | Meyer et al. | 372/92 |
| 4,615,034 | 9/1986 | von Gunten et al. | 372/23 |
| 4,682,340 | 7/1987 | Dave et al. | 372/99 |
| 4,920,541 | 4/1990 | Baumgartner et al. | 372/23 |
| 4,961,202 | 10/1990 | Chaffee | 372/100 |
| 4,970,383 | 11/1990 | Caudle et al. | 372/99 |
| 4,977,573 | 12/1990 | Bittenson et al. | 372/33 |
| 5,016,237 | 5/1991 | Nakamura et al. | 359/669 |
| 5,101,415 | 3/1992 | Kolb et al. | 372/23 |

FOREIGN PATENT DOCUMENTS 0190635 1/1986 European Pat. Off. .

OTHER PUBLICATIONS

Copy of European Search Report, date of completion Nov. 30, 1992, for application EP 92 30 7773, two pages in length.
J. Marling, "1.05-1.44 μm Tunability and Performance of the CW $Nd^{3+}$: YAG Laser," *IEEE Journal of Quantum Electronics*, vol. QE-14, No. 1, Jan. 1978, pp. 56-62.

*Primary Examiner*—Léon Scott, Jr.
*Attorney, Agent, or Firm*—Limbach & Limbach

[57] ABSTRACT

A wedge mirror is disclosed for suppressing the high gain wavelengths in a laser. The mirror is provided with a pair of opposed surfaces lying in nonparallel planes. Each of the surfaces is provided with a wavelength selective coating. The coating on the surface of the mirror facing the gain medium is highly reflective of the high gain wavelength and highly transmissive of the low gain wavelength. This surface is oriented so that the light from the high gain wavelength is reflected out of the cavity. The outer surface of the mirror is highly transmissive of the high gain wavelength and highly reflective of the low gain wavelength. The combination of the wavelength selective coatings and the wedge configuration allows the high gain wavelength to be suppressed while the low gain wavelength oscillates. The subject mirror is particularly suited for suppressing the 1.06 and 1.33 micron wavelengths in Nd:YAG while allowing the 1.44 micron wavelength to lase.

7 Claims, 1 Drawing Sheet

CAVITY MIRROR FOR SUPPRESSING HIGH GAIN LASER WAVELENGTHS

TECHNICAL FIELD

The subject invention relates to a cavity mirror designed to suppress high gain laser wavelengths while allowing low gain wavelengths to oscillate. The cavity mirror is particularly suitable for use with a pulsed, flashlamp pumped Nd:YAG laser wherein the high gain 1.06 micron and moderate gain 1.33 micron wavelengths are suppressed while allowing the 1.44 micron wavelength to lase.

BACKGROUND OF THE INVENTION

Most gain media used in lasers have more than one possible lasing transition. When excited, the laser will generate one or more wavelengths of light. The predominant wavelength or the wavelength with the greatest power is typically the wavelength with the highest gain. It is frequently desired to configure the laser to oscillate primarily or solely at a wavelength other than the predominant wavelength and which has a significantly lower gain.

A number of approaches have been developed in the prior art to suppress high gain wavelengths in favor of lower gain wavelengths. One common approach is to use wavelength selective coatings. For example, the coating on a resonator mirror can be highly reflective for the low gain wavelength and transmissive for the high gain wavelength.

Another approach is to use a dispersing prism which varies the path of the beam with respect to its wavelength. The prism can be placed intracavity or used as an end mirror in a Littrow configuration. In either case, by adjusting the angle of the prism, the laser can be forced to lase at the desired wavelength. Still another approach is to rely on intracavity filters such a etalons or birefringent tuning elements.

All of the above techniques work well in most applications. However, the techniques are not completely successful for selecting a very low gain wavelength when the gain medium has a comparatively very high gain wavelength. An example of this situation is in Nd:YAG which has a very high gain wavelength at 1.06 microns, a medium gain wavelength at 1.33 microns and very low gain wavelengths at 0.94, 1.44 and 1.83 microns.

The following chart found in *IEEE Quantum Electronics*, Volume QE14, No. 1, January, 1978, an article by Marking, illustrates a measure of the relative gains in some of the Wavelengths in Nd:YAG, under continuous pumping conditions.

| Main room-temperature transitions in ND:YAG | | |
|---|---|---|
| Wavelength ([μm], air) | Transition | Relative Performance |
| 1.05205 | $R_2 \to Y_1$ | 46 |
| 1.06152 | $R_1 \to Y_1$ | 92 |
| 1.06414 | $R_2 \to Y_3$ | 100 |
| 1.0646 | $R_1 \to Y_2$ | ~50 |
| 1.0738 | $R_1 \to Y_3$ | 65 |
| 1.0780 | $R_1 \to Y_4$ | 34 |
| 1.1054 | $R_2 \to Y_5$ | 9 |
| 1.1121 | $R_2 \to Y_6$ | 49 |
| 1.1159 | $R_1 \to Y_5$ | 46 |
| 1.12267 | $R_1 \to Y_6$ | 40 |
| 1.3188 | $R_2 \to X_1$ | 34 |
| 1.3200 | $R_2 \to X_2$ | 9 |
| 1.3338 | $R_1 \to X_1$ | 13 |
| 1.3350 | $R_1 \to X_2$ | 15 |
| 1.3382 | $R_2 \to X_3$ | 24 |
| 1.3410 | $R_2 \to X_4$ | 9 |
| 1.3564 | $R_1 \to X_4$ | 14 |
| 1.4140 | $R_2 \to X_6$ | 1 |
| 1.4440 | $R_1 \to X_7$ | 0.2 |

In the situation where the relative gains are so different, a very low level of optical feedback of a high gain wavelength will cause the laser to oscillate at that wavelength. The energy taken by the high gain wavelength will rob the low gain wavelength of substantial power, even to the extent of extinguishing it.

Since the discrimination techniques discussed above are not perfect, some feedback of the high gain wavelength is usually encountered which substantially degrades the output of the low gain wavelength. More particularly, there are no single surface coatings available which can provide the virtually absolute discrimination necessary to suppress the high gain 1.06 micron wavelength in Nd:YAG, especially in the case of pulsed pumping at high inputs to the flashlamps. In addition, in the near infrared, most common glasses used to form intracavity prisms have insufficient dispersion characteristics to adequately discriminate against the 1.06 micron wavelength. Accordingly, in the prior art, in order to maximize power in a low gain wavelength, it was necessary to use a combination of techniques to suppress the high gain wavelength.

Therefore, it would be desirable to provide a simple approach for a two mirror cavity resonator which would suppress a high gain wavelength and allow a low gain wavelength to lase.

Accordingly, it is an object of the subject invention to provide a resonator mirror configured to suppress a high gain wavelength while allowing a lower gain wavelength to lase.

It is another object of the subject invention to provide a resonator mirror which includes coatings on two surfaces for suppressing the oscillation of a high gain laser wavelength.

It is a further object of the subject invention to provide a resonator mirror which has a wedge shaped configuration and is oriented to reflect the high gain wavelength out of the cavity while reflecting the low gain wavelength back along the resonator axis.

It is still another object of the subject invention to provide a resonator structure for suppressing the 1.06 wavelength emission from Nd:YAG while allowing wavelengths of lesser gain to oscillate.

SUMMARY OF THE INVENTION

In accordance with these and other objects, the subject invention includes a resonator mirror for discriminating against high gain laser wavelengths. The mirror is used in the resonator of a laser which includes a gain medium having multiple laser transitions. When excited, the gain medium is capable of lasing at different wavelengths having different gains.

The subject mirror has a pair of opposed surfaces lying in nonparallel planes to define a wedge configuration. The use of dispersion effects in a wedge type prism are well known for wavelength selection. However, in the prior art, the inner surface of the prism (i.e. the surface facing the gain medium) is typically transmissive to all wavelengths. In contrast, in the subject invention, the inner surface of the prism is provided with a coating that is highly reflective to the high gain wavelength and transmissive to the lower gain wavelength. Moreover, the mirror is oriented so that the high gain wavelength is reflected out of the cavity so that it will not rob the pump energy from the low gain wavelength.

The outer surface of the mirror is provided with a coating which is reflective of the low gain wavelength. The mirror is oriented so that the low gain wavelength is incident perpendicularly to that outer surface. The reflected low gain wavelength will return along the axis of the resonator so that it may be amplified.

In one embodiment of the subject invention, the mirror is used as the high reflector mirror of the cavity. In this case, it is preferable to configure the coating on the outer surface to be highly transmissive to the high gain wavelength. In this manner, light which is not reflected by the inner surface will be transmitted by the outer surface. Moreover, any light which is not transmitted will be subject to being reflected out of the cavity as it strikes the inner surface of the mirror on the return pass. Thus, the single wedged mirror provides three interfaces and therefore three opportunities to suppress the high gain wavelengths. In addition, the dispersion effects of the wedge configuration redirect any of the remaining high gain wavelength so that it is not coaxial with the laser resonator.

The subject mirror could also be used as an output coupler. In this case, the outer surface would be partially transmissive of the low gain wavelength. The outer surface can be made either transmissive or reflective of the high gain wavelength.

Further objects of the subject invention will become apparent from the following detailed description taken in conjunction with the drawings in which:

DETAILED DESCRIPTION OF THE PREFERRED EMBODIMENTS

Figure 1:
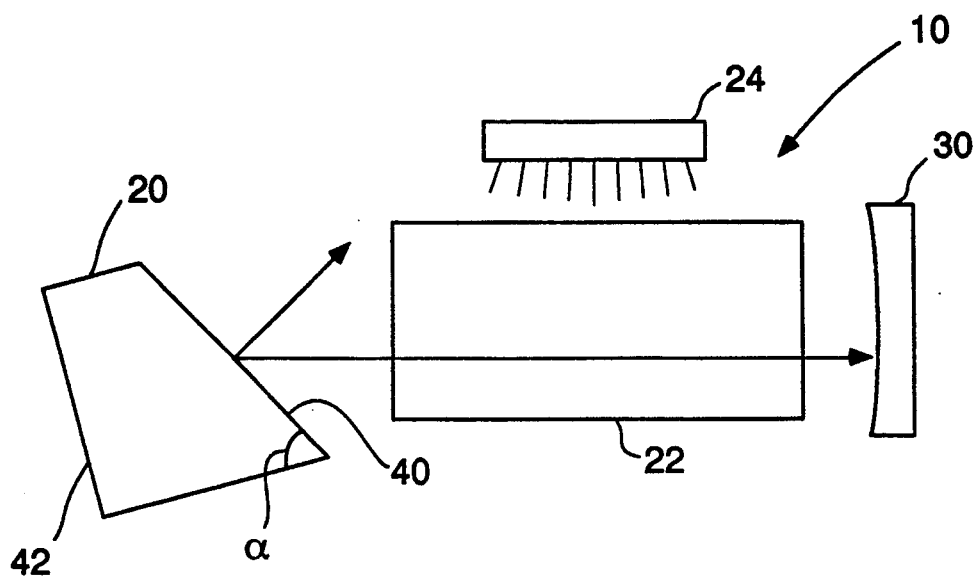
FIG. 1 is a schematic diagram of a laser incorporating the mirror of the subject invention.

Referring to FIG. 1 there is illustrated a laser 10 utilizing the mirror 20 of the subject invention. The laser 10 includes a gain medium 22 having at least two laser transitions corresponding to two different wavelength outputs. One of the output wavelengths has a gain higher than the other. Such a situation can found in Nd:YAG laser wherein the 1.06 micron wavelength has a very high gain, especially under pulsed pumping conditions. A number of lower output gain wavelengths also exist at 0.96, 1.32, 1.44 and 1.88 microns. The ends of the gain medium should be antireflection coated. The gain medium is pumped with a suitable source 24 such as flashlamp. This technique is not limited to flashlamp pumping, however The gain medium is located within a resonant cavity. As illustrated in FIG. 1, the cavity can include an output coupler 30 and the wedge mirror 20 of the subject invention. The surfaces of the output coupler are coated for the correct transmission of the selected wavelength.

In accordance with the subject invention, the wedge mirror 20 is provided with two surfaces 40 and 42 which lie in nonparallel planes. The angle $\alpha$ is chosen to ensure that the unwanted high gain wavelengths are deviated enough from the cavity such that none of the reflected light returns to the gain medium. The angle $\alpha$ will be greater for shorter length resonators. The material used for the substrate depends upon the wavelength used. Infrasil, a form of fused quartz, is suitable for Nd:YAG systems.

In accordance with the subject invention, both surfaces 40 and 42 of mirror 20 are provided with wavelength selective coating. The inner surface 40 is provided with a coating that is highly reflective of the high gain wavelengths. In the case of Nd:YAG, the coating would be highly reflective of the 1.06 and 1.33 micron radiation. A coating having a reflectivity of 99 percent for 1.06 micron radiation is well within the capabilities of one skilled in the art. The coating on surface 40 should also be highly transmissive of the low gain wavelength of interest. The level of transmission should be close to 99 percent.

In accordance with the subject invention, the rear surface 42 of the mirror 20 is provided with a coating that is reflective of the low gain wavelength. In the preferred embodiment, where the wedge mirror is used as the high reflector of the cavity, surface 42 should be 99 percent reflective of the low gain wavelength. In this embodiment, the coating should be roughly 80 percent transmissive of the high gain wavelengths.

In accordance with the subject invention, the mirror 20 is oriented such that the light reflected off the inner surface 40 will be directed out of the cavity. In addition, the mirror should be oriented so that the low gain wavelength will be incident on the outer surface 42 at 90 degrees or normal thereto.

Figure 2:
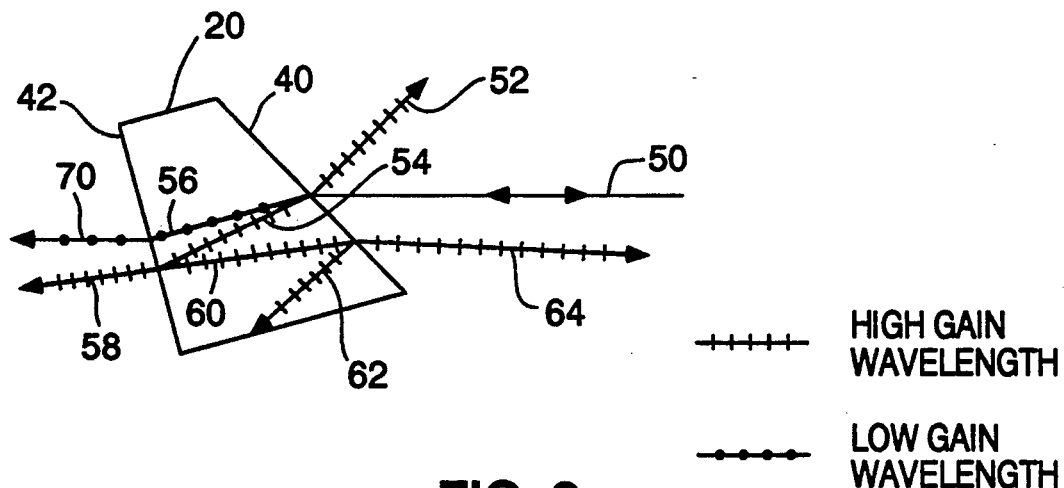
FIG. 2 is an enlarged view of the mirror of the subject invention illustrating the ray paths.

The result of the specified mirror orientation and coatings is better illustrated in FIG. 2. The light 50 incident on the inner surface 40 contains both the high and the low gain wavelengths. The high gain wavelength will be substantially reflected from the front surface and out of the cavity as shown by ray 52. The small portion 54 of the high gain wavelength which is transmitted by the front surface will be refracted and because of the dispersion of the material, will follow a different path from the low gain wavelength 56.

When the high gain beam 54 reaches the outer surface 42, most of the remaining energy will be transmitted therethrough as shown by ray 58. Although most of the high gain energy will have been ejected from the cavity by the two mirror surfaces, some small amount of light will remain and be reflected back to the front surface along ray 60. When ray 60 strikes the front surface of the mirror, most of the remaining energy will be reflected down and out of the cavity along ray 62. The last, substantially weakened portion of the beam exiting the mirror along ray 64 will be displaced from the main beam so that it chances of being amplified are substantially reduced. The subject mirror provides for an energy reduction of the high gain wavelength on the order of $10^{-5}$ which is enough to suppress the 1.06 micron wavelength of Nd:YAG; even under high energy pulsed pumping conditions.

Assuming the mirror 20 is used as the high reflector in the resonant cavity, surface 42 should be highly reflective of the low gain wavelength. Thus, substantially all of the low gain wavelength light will be reflected back along the axis of the cavity so that is can be amplified and allowed to oscillate.

While it may be more convenient to utilize the subject mirror as the high reflector in the resonant cavity, it may also be used as the output coupler. In this case, the outer surface 42 must be partially transmissive to the low gain wavelength so that the output beam 70 can exit the cavity. The coating on the rear surface can also be transmissive for the high gain wavelength. In this case, some form of deflector would be desirable to redirect the high gain light away from the path of the low gain radiation. Alternatively, the outer surface 42 can be reflective of the high gain wavelength, however in this case, discrimination would be limited to the reflections off the inner surface 40. If this surface is 99 percent reflective of the high gain wavelengths, an attenuation of $10^{-4}$ will still be achieved.

The subject mirror was fabricated and tested in a laser which included a Nd:YAG rod, 4 inches in length and 0.25 inches in diameter. The rod had 1.1 percent Nd dopant level. The ends of the rod were AR coated at 1.06, 1.32 and 1.44 microns. The rod was placed in a double ellipse pump cavity having a pair of flashlamps. The input to the lamps was set at 250 joules per pulse at 30 Hz. When this laser was operated with standard mirrors, 265 watts of laser light at 1.06 microns was generated. With the resonator described in FIG. 1, including the subject mirror 20, 57 watts average power was achieved at 1.44 microns with no lasing occurring at 1.06 microns. As an example of the extreme differential gain between these two wavelengths, if the laser was operated as described above, except that the ends of the rods were not AR coated, the laser would still lase at 1.06 microns.

While the subject invention has been described with reference to the preferred embodiments, various changes and modifications could be made therein, by one skilled in the art, without varying from the scope and spirit of the subject invention as defined by the appended claims.

We claim:

1. A laser comprising:
   a gain medium formed from Nd:YAG and having at least two laser transitions corresponding to two wavelengths with one of said wavelengths having a high gain and the other wavelength having a low gain and wherein said high gain wavelength is 1.06 microns and said low gain wavelength is 1.44 microns;
   means for exciting the gain medium to generate light at said two wavelengths; and
   a pair of mirrors surrounding said gain medium to define a resonant cavity, with one of said mirrors having opposed first and second surfaces and defining a wedge configuration, said first surface facing the gain medium and having a first wavelength selective coating, said first coating being highly reflective for the high gain wavelength and highly transmissive for the low gain wavelength and with said second surface having a second wavelength selective coating which is at least partially reflective for the low gain wavelength and with said one mirror being oriented so that the high gain wavelength that strikes the first surface is reflected out of the cavity and so that the low gain wavelength strikes the second surface substantially normal thereto, with the first and second coatings and the wedge configuration of said one mirror functioning to suppress oscillation of the high gain wavelength while allowing oscillation of the low gain wavelength.

2. A laser as recited in claim 1 wherein said one mirror is the high reflector of said resonant cavity, and wherein said second coating on said second surface is highly reflective of said low gain wavelength.

3. A laser as recited in claim 2 wherein the second coating on said second surface is highly transmissive of said high gain wavelength.

4. A laser as recited in claim 1 wherein said one mirror is the output coupler of said resonant cavity, and wherein the second coating on said second surface partially transmissive to said low gain wavelength and is highly transmissive for said high gain wavelength.

5. A laser as recited in claim 1 wherein said one mirror is the output coupler of said resonant cavity, and wherein the second coating on said second surface is partially transmissive for said low gain wavelength and is also highly reflective for said high gain wavelength.

6. A laser as recited in claim 1 wherein said mirror is formed from a highly dispersive material.

7. A laser comprising:
   a gain medium having at least two laser transitions corresponding to two wavelengths with one of said wavelengths having a high gain and the other wavelength having a low gain;
   means for exciting the gain medium to generate light at said two wavelengths; and
   a pair of mirrors surrounding said gain medium to define a resonant cavity, with one of said mirrors defining the high reflector and having opposed first and second surfaces and defining a wedge configuration, said first surface facing the gain medium and having a first wavelength selective coating, said first coating being highly reflective for the high gain wavelength and highly transmissive for the low gain wavelength and with said second surface having a second wavelength selective coating which is highly reflective for the low gain wavelength and is highly transmissive of said high gain wavelength and with said one mirror being oriented so that the high gain wavelength that strikes the first surface is reflected out of the cavity and so that the low gain wavelength strikes the second surface substantially normal thereto, with the first and second coatings and the wedge configuration of said one mirror functioning to suppress oscillation of the high gain wavelength while allowing oscillation of the low gain wavelength.

* * * * *